(12) United States Patent
Lyons et al.

(10) Patent No.: US 10,099,683 B2
(45) Date of Patent: Oct. 16, 2018

(54) METHOD AND APPARATUS FOR CONTROLLING A HYBRID POWERTRAIN SYSTEM

(71) Applicant: GM GLOBAL TECHNOLOGY OPERATIONS LLC, Detroit, MI (US)

(72) Inventors: Scott P. Lyons, Davisburg, MI (US); John J. Janczak, Commerce Township, MI (US); Tim M. Grewe, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 128 days.

(21) Appl. No.: 15/244,583

(22) Filed: Aug. 23, 2016

(65) Prior Publication Data

US 2017/0267230 A1    Sep. 21, 2017

Related U.S. Application Data

(60) Provisional application No. 62/310,253, filed on Mar. 18, 2016.

(51) Int. Cl.
*B60W 20/17* (2016.01)
*B60K 6/44* (2007.10)
(Continued)

(52) U.S. Cl.
CPC .............. *B60W 20/17* (2016.01); *B60K 6/44* (2013.01); *B60W 10/06* (2013.01); *B60W 10/08* (2013.01); *B60W 10/26* (2013.01); *B60W 20/00* (2013.01); *B60W 30/182* (2013.01); *B60W 2520/10* (2013.01); *B60W 2540/04* (2013.01); *B60W 2710/0644* (2013.01); *Y02T 10/6286* (2013.01); *Y10S 903/902* (2013.01)

(58) Field of Classification Search
CPC ...... B60W 20/17; B60W 10/06; B60W 10/10; B60W 30/182; B60W 10/26; B60W 2510/244; B60W 2540/10; B60W 2710/1005; B60W 2710/0644; B60K 6/44; Y10S 903/902
See application file for complete search history.

(56) References Cited

U.S. PATENT DOCUMENTS

2014/0210216 A1*  7/2014  Konishi ................... B60K 6/48
                                                                  290/38 R
2015/0224979 A1*  8/2015  Grenn ................... B60W 20/00
                                                                       701/22

* cited by examiner

*Primary Examiner* — Anne M Antonucci
(74) *Attorney, Agent, or Firm* — Quinn IP Law (57) ABSTRACT

A method for controlling a hybrid powertrain system includes determining an operator-selected mode and a charging mode for the energy storage device. A first speed/load region at which the internal combustion engine is in an OFF state is determined for the operator-selected mode and the charging mode for the energy storage device, wherein the first speed/load region is defined by output torque and vehicle speed. A second speed/load region includes a preferred speed that is selected for operating the internal combustion engine is determined for the operator-selected mode and the charging mode for the energy storage device. The preferred engine speed is substantially imperceptible in a passenger compartment of the vehicle. The internal combustion engine is operated at the preferred engine speed that is imperceptible in the passenger compartment when the output torque request and the present vehicle speed are within the second operating region.

18 Claims, 4 Drawing Sheets

(51) Int. Cl.
*B60W 10/06* (2006.01)
*B60W 10/26* (2006.01)
*B60W 30/182* (2012.01)
*B60W 10/10* (2012.01)
*B60W 10/08* (2006.01)
*B60W 20/00* (2016.01)

METHOD AND APPARATUS FOR CONTROLLING A HYBRID POWERTRAIN SYSTEM

CROSS-REFERENCE TO RELATED APPLICATIONS

This application claims the benefit of U.S. Provisional Patent Application No. 62/310,253 filed on Mar. 18, 2016, the disclosure of which is hereby incorporated by reference.

TECHNICAL FIELD

This disclosure relates to powertrain systems employing multiple torque-generative devices and dynamic system controls associated therewith.

BACKGROUND

Hybrid powertrain systems generate propulsion torque from two or more energy sources, e.g., hydrocarbon-based fuels through an internal combustion engine, and electric power through one or more electric machines, with the propulsion torque transferred through a geartrain to an output member that is coupled to a driveline.

Control systems for operating hybrid powertrain systems control torque outputs of the engine and electric machine(s) and apply torque transfer elements in the transmission to transfer torque in response to operator-commanded output torque requests, taking into account fuel economy, emissions, drivability, and other factors. A control system monitors various inputs from the vehicle and the operator and provides operational control of the hybrid powertrain, including controlling transmission operating mode and gear shifting, controlling torque outputs from the engine and electric machine(s), and regulating the electrical power interchange among the electrical energy storage device and the electric machines to manage outputs of the transmission, including torque and rotational speed.

Hybrid powertrain systems may operate in an electric vehicle (EV) mode, wherein all propulsion torque is generated by the electric machine(s) with the internal combustion engine in an OFF state, and electrically-variable modes (EVT), wherein the internal combustion engine is in an ON state and may generate some or all of the propulsion torque, or may be transferred to an electric machine to generate electric power that is transferable to the electric machine(s) to generate propulsion torque.

Operating a hybrid powertrain system in the EV mode may enhance customer satisfaction. However, operating in the EV mode at or near system limits for such operation may reduce customer satisfaction related to engine startability and tip-in response.

SUMMARY

A hybrid powertrain system for a vehicle is described, and includes an internal combustion engine and an electric machine that are mechanically coupled via a geartrain to generate mechanical power that is transferable to a driveline and generate electric power that is storable on an energy storage device. A method for control includes determining an operator-selected mode and a charging mode for the energy storage device. A first speed/load region at which the internal combustion engine is in an OFF state is determined for the operator-selected mode and the charging mode for the energy storage device, wherein the first speed/load region is defined by output torque and vehicle speed. A second speed/load region includes a preferred speed that is selected for operating the internal combustion engine is determined for the operator-selected mode and the charging mode for the energy storage device. The first speed/load region is defined by output torque and vehicle speed and wherein the preferred engine speed is substantially imperceptible in a passenger compartment of the vehicle. An output torque request and a present vehicle speed are determined, and the internal combustion engine is operated at the preferred engine speed that is imperceptible in the passenger compartment when the output torque request and the present vehicle speed are within the second operating region.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
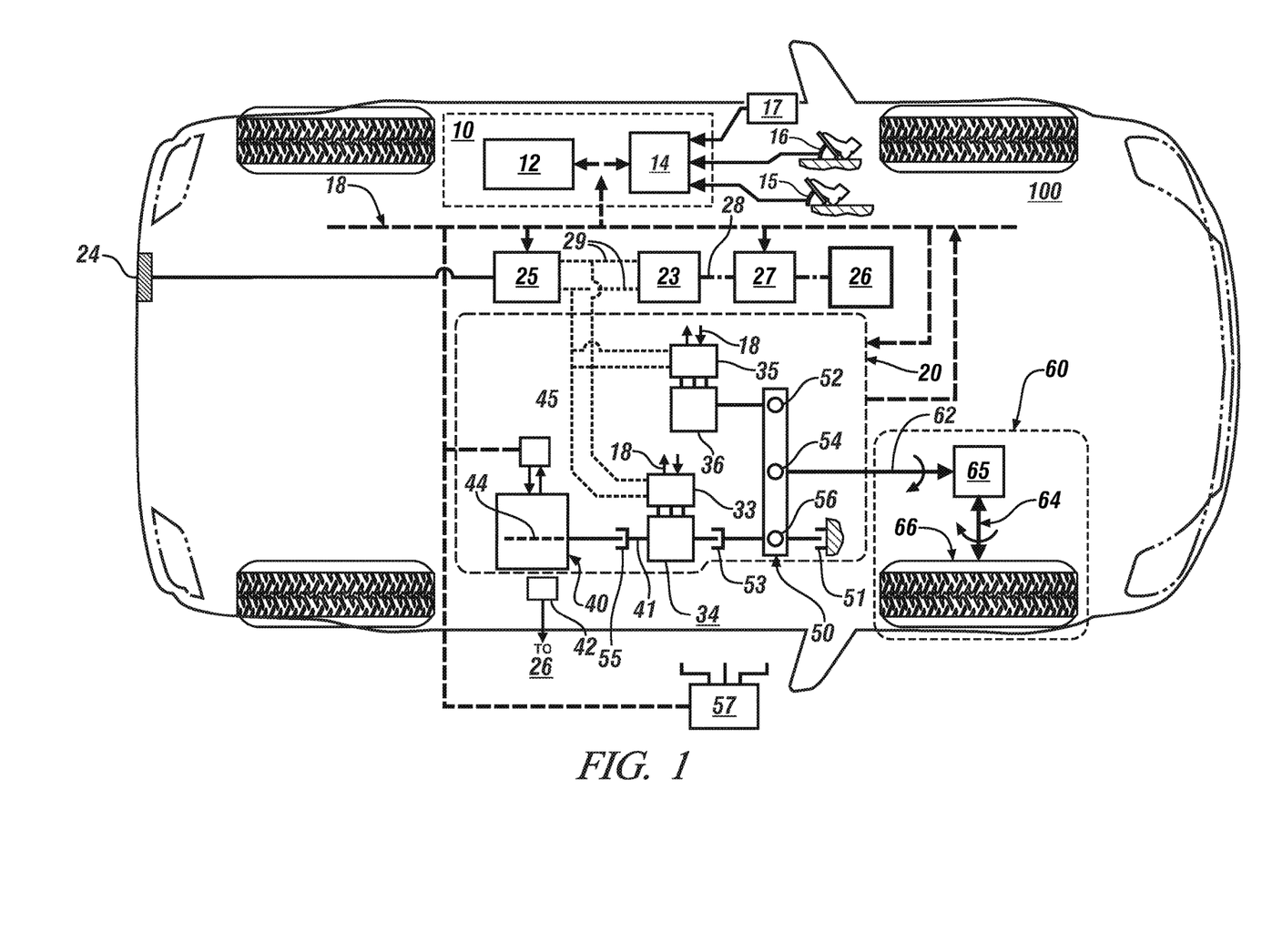
FIG. 1 schematically illustrates a hybrid powertrain system that includes an internal combustion engine, transmission and non-combustion electric machines that couple to a driveline, in accordance with the disclosure.

Referring now to the drawings, wherein the showings are for the purpose of illustrating certain exemplary embodiments only and not for the purpose of limiting the same, FIG. 1 schematically shows a vehicle 100 including a hybrid powertrain system 20 coupled to a driveline 60 and controlled by a control system 10. Like numerals refer to like elements throughout the description. The powertrain system 20 includes multiple torque-generating devices including an internal combustion engine (engine) and transmission 40, and first and second electrically-powered torque machines (electric machines) 34, 36, respectively, that rotatably couple a gear train 50. An output member 62 couples between the gear train 50 and a driveline 60. Thus, the internal combustion engine and transmission 40 and the first and second electric machines 34, 36 couple to the gear train 50 and are controllable to generate an output torque that is transferred to the driveline 60 as propulsion torque for the vehicle 100. The arrangement shown is in the form of an output-split electrically variable transmission, and is non-limiting.

Other embodiments of a multi-mode powertrain system that include an internal combustion engine and an electric machine that are arranged to generate propulsion torque and also generate electric power may instead be employed within the scope of this disclosure. By way of definition, 'output torque' refers to positive (tractive) torque and negative (braking) torque that is generated by the powertrain system 20 and is transferred to the output member 62. The powertrain system 20 is "hybrid" in that it employs two or more sources of power for vehicle propulsion. Some examples of suitable vehicles employing some form of hybrid powertrain systems include, but are not limited to hybrid electric vehicles (HEVs), plug-in hybrid electric vehicles (PHEVs), extended range electric vehicles (EREVs), two-mode hybrids, power-assist hybrids, series hybrids, parallel hybrids, series-parallel hybrids, power-split hybrids, belt-alternator-starter hybrids, hydraulic hybrids, pneumatic hybrids, etc. Vehicles may include passenger cars, cross-over vehicles, sports-utility vehicles, recreational vehicles, trucks, buses, commercial vehicles, etc. Although the following description is provided in the context of an exemplary plug-in hybrid electric vehicle (PHEV) with a range-extending series hybrid configuration, it should be appreciated that the present method may be used with any hybrid vehicle and is not limited to any particular type.

One embodiment of the engine and transmission 40 and the first and second electric machines 34, 36 that couple to the gear train 50 and generate output torque that is transferred to the driveline 60 to generate propulsion torque is now described. A crankshaft 44 of the internal combustion engine 40 couples to an input member 41 that couples to a rotor of the first electric machine 34 via a third clutch 55. An output member from the rotor of the first electric machine 34 couples via a second clutch 53 to a ring gear 56 of the gear train 50. The second electric machine 36 rotatably couples to a sun gear 52 of the gear train 50. A planet gear carrier 54 of the gear train 50 couples via the output member 62 to the driveline 60. The ring gear 56 is couplable via a first clutch/brake 51 to a chassis ground. In one embodiment, the gear train 50 is a simple planetary gear set including sun gear 52, planet gear and carrier 54, and ring gear 56. A transmission controller (TCM) 57 monitors rotational speeds of various rotating members and controls activations of the first, second and third clutches 51, 53 and 55.

The engine 40 is preferably a multi-cylinder internal combustion engine that converts fuel to mechanical torque through a thermodynamic combustion process. The engine 40 is equipped with a plurality of actuators and sensing devices for monitoring operation and delivering fuel to form in-cylinder combustion charges that generate an expansion force that is transferred via pistons and connecting rods to the crankshaft 44 to produce torque. Operation of the engine 40 is controlled by an engine controller (ECM) 45. The engine 40 may include a low-voltage solenoid-actuated electrical starter 42 for engine starting in response to a key-crank event in one embodiment. The engine 40 is configured to execute engine stop/start operations, including executing autostart and autostop routines during vehicle operation. The engine 40 may be configured to execute autostart and autostop control routines, fuel cutoff (FCO) control routines and cylinder deactivation control routines during ongoing operation of the powertrain system 20. The engine 40 is considered to be in an OFF state when it is not rotating. The engine 40 is considered to be in an ON state when it is rotating, including one or more FCO states in which it is spinning and unfueled. The transmission may be any suitable device, and is a step-gear transmission that is configured to transfer engine speed and torque at one of a plurality of fixed gear ratios in response to operator inputs in one embodiment.

The first and second electric machines 34, 36 are preferably high-voltage multi-phase electric motor/generators that electrically connect to a high-voltage DC energy storage device (battery) 25 via first and second inverter modules 33, 35, respectively. The terms "energy storage device" and "battery" are used interchangeably throughout the specification. The first and second electric machines 34, 36 are configured to convert stored electric energy to mechanical power and convert mechanical power to electric energy that may be stored in the battery 25. The battery 25 may be any high-voltage energy storage device, e.g., a multi-cell lithium ion device, an ultracapacitor, or another suitable device without limitation. In one embodiment, the battery 25 may electrically connect via an on-vehicle battery charger 24 to a remote, off-vehicle electric power source for charging while the vehicle 100 is stationary. The battery 25 electrically connects to the first inverter module 33 via the high-voltage DC bus 29 to transfer high-voltage DC electric power to the first electric machine 34 in response to control signals originating in the control system 10. Likewise, the battery 25 electrically connects to the second inverter module 35 via the high-voltage DC bus 29 to transfer high-voltage DC electric power to the second electric machine 36 in response to control signals originating in the control system 10.

Each of the first and second electric machines 34, 36 includes the rotor and a stator, and electrically connects to the high-voltage battery 25 via the corresponding first and second inverter modules 33, 35, respectively, and the high-voltage DC bus 29. The first and second inverter modules 33, 35 are both configured with suitable control modules including power transistors, e.g., IGBTs for transforming high-voltage DC electric power to high-voltage AC electric power and transforming high-voltage AC electric power to high-voltage DC electric power. Each of the first and second inverter modules 33, 35 preferably employs pulsewidth-modulating (PWM) control to convert stored DC electric power originating in the high-voltage battery 25 to AC electric power to drive the respective first and second electric machines 34, 36 to generate torque. Similarly, each of the first and second inverter modules 33, 35 converts mechanical power transferred to the respective first and second electric machines 34, 36 to DC electric power to generate electric energy that is storable in the battery 25, including as part of a regenerative power control strategy. The first and second inverter modules 33, 35 are both configured to receive motor control commands and control inverter states to provide the motor drive and regenerative braking functionality. In one embodiment, a DC/DC electric power converter 23 electrically connects to a low-voltage bus 28 and a low-voltage battery 27, and electrically connects to the high-voltage DC bus 29. Such electric power connections are known and not described in detail. The low-voltage battery 27 electrically connects to an auxiliary power system 26 to provide low-voltage electric power to low-voltage systems on the vehicle, including, e.g., electric windows, HVAC fans, seats, and the low-voltage solenoid-actuated electrical starter 42.

The driveline 60 may include a differential gear device 65 that mechanically couples to an axle, transaxle or half-shaft 64 that mechanically couples to a wheel 66 in one embodiment. The driveline 60 transfers propulsion torque between the gear train 50 and a road surface.

An operator interface 14 of the vehicle 100 includes a controller that signally connects to a plurality of human/machine interface devices through which the vehicle operator commands operation of the vehicle 100. The human/machine interface devices include, e.g., an accelerator pedal 15, a brake pedal 16, a transmission range selector (PRNDL) 17. Other human/machine interface devices preferably include an ignition switch to enable an operator to crank and start the engine 40, a steering wheel, and a headlamp switch. The accelerator pedal 15 provides signal input indicating an accelerator pedal position and the brake pedal 16 provides signal input indicating a brake pedal position. The transmission range selector 17 provides signal input indicating direction of operator-intended motion of the vehicle including a discrete number of operator-selectable positions indicating the preferred rotational direction of the output member 62 in either a forward or a reverse direction. As shown, transmission range selector 17 may also be capable of selecting a preferred powertrain operating mode, such as a normal mode, a sport mode, a mountain mode, or another suitable powertrain operating mode. The powertrain operating modes are employed to provide operator preferences to the vehicle controller 12, with such preferences including one of a plurality of preferred transmission shift patterns and one of a plurality of preferred battery SOC levels. One of the plurality of preferred transmission shift patterns may be selected based upon preferred shifting patterns associated with the speed and load, such as an aggressive shift pattern or a shift pattern that maximizes fuel economy. One of a plurality of preferred battery SOC levels may be selected depending upon expected operation of the vehicle, such as climbing a grade, or discharging to achieve a minimum SOC in anticipation of reaching a destination point.

The control system 10 includes controller 12 that signally connects to the operator interface 14. The controller 12 preferably includes a plurality of discrete devices that are co-located with the individual elements of the powertrain system 20 to effect operational control of the individual elements of the powertrain system 20 in response to operator commands and powertrain demands. The controller 12 may also include a control device that provides hierarchical control of other control devices. The controller 12 communicatively connects to each of the high-voltage battery 25, the first and second inverter modules 33, 35, the ECM 45 and the TCM 57, either directly or via a communications bus 18 to monitor and control operation thereof.

The controller 12 commands operation of the powertrain system 20, including selecting and commanding operation in one of a plurality of operating modes to generate and transfer torque between the torque generative devices, e.g., the engine 40 and the first and second electric machines 34, 36 and the driveline 60. The operating modes preferably include one or more electric-vehicle (EV) modes wherein the engine 40 is in the OFF state and the first and/or the second electric machines 34, 36 generate propulsion torque. The operating modes preferably also include an electrically-variable mode wherein the engine 40 and one or both of the first and second electric machines 34, 36 generate propulsion torque. The operating modes preferably also include an extended-range EV mode wherein the engine 40 is in the ON state and generating electric power through the first electric machine 34 and the second electric machine 36 is generating propulsion torque. The extended-range EV mode, the EV mode and the electrically-variable mode each have an associated battery charging mode that may be either a charge-sustaining mode or a charge-depleting mode. The charge-depleting mode may include operating with the engine 40 in the OFF state, and the charge-sustaining mode include operating with the engine 40 in the ON state. The charge-sustaining mode indicates powertrain operation wherein a state of charge (SOC) of the battery 25 is preferably maintained at a predetermined level with a possibility of short-term variations associated with vehicle operation. The charge-depleting mode indicates powertrain operation wherein SOC of the battery 25 is preferably depleted at a predetermined rate, with a possibility of short-term variations associated with vehicle operation.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be periodically executed at regular intervals, for example each 100 microseconds or 3.125, 6.25, 12.5, 25 and 100 milliseconds during ongoing operation. Alternatively, routines may be executed in response to occurrence of a triggering event.

The powertrain system 20 includes a communications scheme including the communications bus 18 to effect communications in the form of sensor signals and actuator command signals between the control system 10, the vehicle 100 and the powertrain system 20. The communications scheme employs one or more communications systems and devices, including, e.g., the communications bus 18, a direct connection, a local area network bus, a serial peripheral interface bus, and wireless communications to effect information transfer. Communication between controllers and communication between controllers, actuators and/or sensors may be accomplished using a direct wired link, a networked communications bus link, a wireless link or any another suitable communications link. Communication includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communication signals between controllers. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Methods and systems, in the form of control routines and associated calibrations may be employed to provide improved responsiveness of the powertrain system to operator commands such as accelerator pedal tip-in events. Such responsiveness may provide an improved operator perception associated with powertrain operation in the EV mode, including operation that includes any one of a plurality of operator-selectable modes. This includes a control routine that may manipulate engine speed and engine torque at different vehicle speeds and axle torque commands based on different operator-selectable modes such that the operator is less likely to perceive engine operation. The control routine controls the engine to act differently based on charge state, operator-selectable mode, vehicle speed, and axle torque commands while generating output torque that is responsive to the output torque request.

Figure 2:
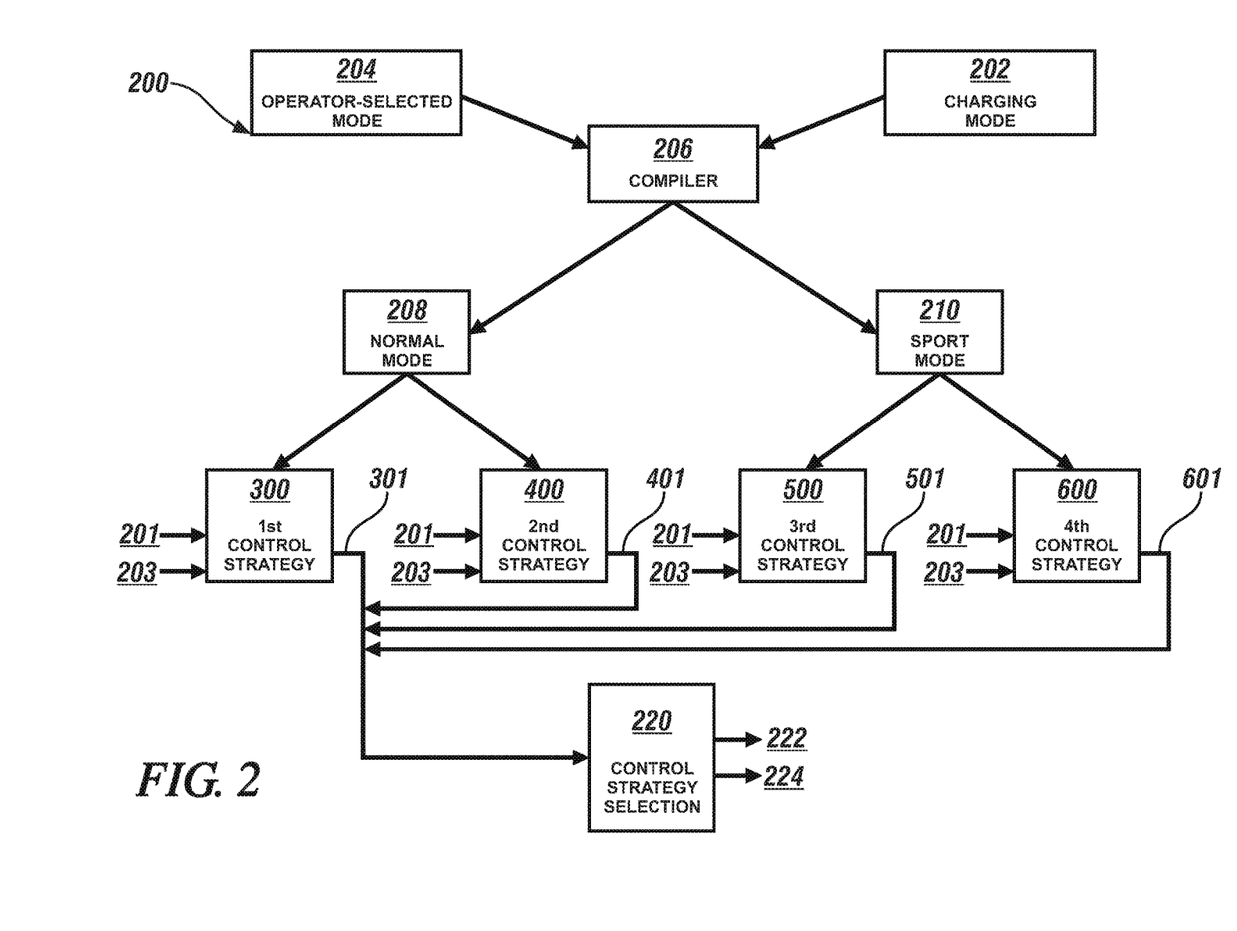
FIG. 2 schematically illustrates a signal flow diagram for a powertrain control routine to control an embodiment of the powertrain system described with reference to FIG. 1, including advantageously operating the internal combustion engine within a speed region that is imperceptible in the passenger compartment under conditions defined by the output torque request and the vehicle speed, in accordance with the disclosure.

FIG. 2 schematically shows a signal flow diagram for a powertrain control routine 200 to control a powertrain system that includes an internal combustion engine and an electric machine that are mechanically coupled via a geartrain. The powertrain control routine 200 advantageously operates the internal combustion engine at a preferred speed within a speed range that is imperceptible in the passenger compartment to the vehicle operator under conditions defined by the output torque request and the vehicle speed. The powertrain system operates to generate an output torque that is transferable to a driveline and either generate or consume electric power that is storable on an energy storage device. One non-limiting embodiment includes the vehicle 100 and powertrain system 20 that are described with reference to FIG. 1.

The powertrain control routine 200 includes determining an operator-selected mode (204) and determining charging information related to the energy storage device that may be used in selecting a preferred charging mode (202). The charging information includes factors such as SOC, battery temperature and other related factors. The operator-selected mode may be one of a normal mode, a sport mode, a mountain mode, etc., and indicates operator-selectable preferences for transmission shifting, battery charging, and other elements. The preferred charging mode may be one of a charge-sustaining mode and a charge-depletion mode. The charge-depletion mode and the charge-sustaining mode refer to control routines for managing a state of charge (SOC) of the energy storage device. In the charge-depletion mode, the powertrain control system controls powertrain operation such that the SOC of the energy storage device achieves a minimum state during a vehicle trip, or key-on cycle, and manages torque from the internal combustion engine and torque from the electric machine(s) based thereon. In a charge-sustaining mode, the powertrain control system controls powertrain operation such that the SOC of the energy storage device is at or near the same level at end of a vehicle trip as it was at a beginning of the vehicle trip, and manages torque from the internal combustion engine and torque from the electric machine(s) based thereon. The operator selected mode (204) and the preferred charging mode (202) are compiled (206).

When a first operator-selectable mode, e.g., the normal mode is selected (208) and the preferred charging mode is the charge-depletion mode, a first control strategy 300 is selected for determining a first preferred engine speed 301 while controlling operation of the powertrain system in response to an output torque request 201 and an output speed 203. The output torque request 201 and the output speed 203 may be readily translated to output power and vehicle speed based upon factors that are readily determined. The first control strategy 300 is described with reference to FIG. 3.

When the first operator-selectable mode, e.g., the normal mode is selected (208) and the preferred charging mode is the charge-sustaining mode, a second control strategy 400 is selected for determining a second preferred engine speed 401 while controlling operation of the powertrain system in response to an output torque request 201 and an output speed 203. The second control strategy 400 is described with reference to FIG. 4.

When a second operator-selectable mode, e.g., the sport mode is selected (210) and the preferred charging mode is the charge-depletion mode, a third control strategy 500 is selected for determining a third preferred engine speed 501 while controlling operation of the powertrain system in response to an output torque request 201 and an output speed 203. The third control strategy 500 is described with reference to FIG. 5.

When the second operator-selectable mode, e.g., the sport mode is selected (210) and the preferred charging mode is the charge-sustaining mode, a fourth control strategy 600 is selected for determining a fourth preferred engine speed 601 while controlling operation of the powertrain system in response to an output torque request 201 and an output speed 203. The fourth control strategy 600 is described with reference to FIG. 6.

Referring again to FIG. 3, a plurality of speed/load operating regions associated with the first control strategy 300 are graphically shown, and are associated with the normal mode for powertrain operation with charge-depletion of the energy storage device. The numerical values are non-limiting and provided for purposes of illustration. Speed 302 is shown on the horizontal axis in the form of vehicle speed (mph) and load 304 is shown on the vertical axis in the form of transmission output power (kW). The magnitudes for the speed 302 and load 304 are merely illustrative of one non-limiting embodiment. Line 303 indicates a maximum charging power that is associated with a maximum negative value for the load 304. Line 305 illustrates a speed/load boundary indicating a transition between engine ON and OFF states. Line 325 illustrates a second speed/load boundary line.

Figure 3:
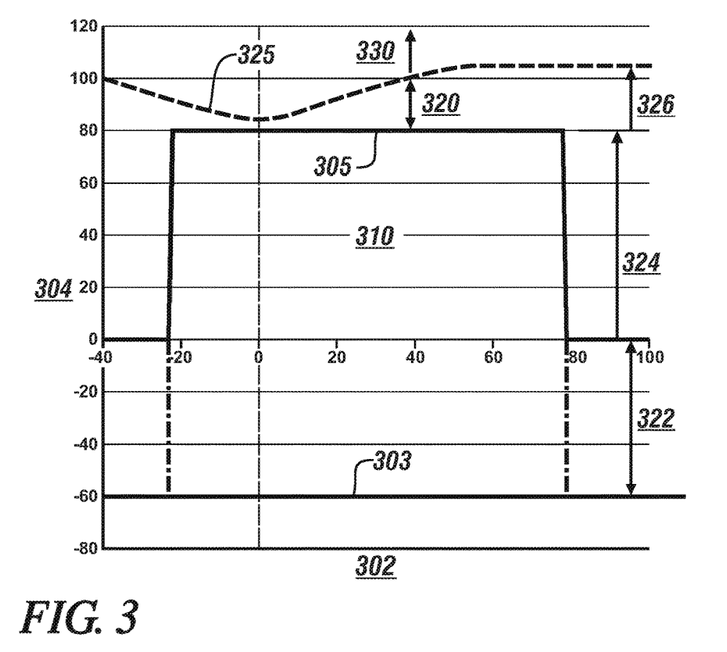
FIG. 3 graphically illustrates a plurality of operating regions defined by vehicle speed and transmission output power that are associated with a first control strategy including operating the powertrain system in the normal mode with charge-depletion of the energy storage device, in accordance with the disclosure.

A first speed/load region 310 is circumscribed by lines 303 and 305, and indicates speed/load operating points at which the internal combustion engine is in an OFF state, and all propulsion torque is supplied by the electric machine(s).

A second speed/load region 320 is circumscribed by lines 305 and 325, and indicates speed/load operating points at which the internal combustion engine is in the ON state with its operation constrained in a manner that renders its operation substantially imperceptible in the passenger compartment and to the vehicle operator. The limits associated with the second speed/load region 320 may be empirically determined for a vehicle and powertrain system configuration. This may include capturing acoustic measurements at one or more locations within a vehicle interior under smooth road conditions at various road load conditions, over a range of speed and load conditions for the engine and the electric machine. Operation of the internal combustion engine may be considered to substantially imperceptible in the passenger compartment and to the vehicle operator when the sound energy, in decibels, that is generated by operation of the internal combustion engine is less than the sound energy that is generated by operation of the vehicle on a smooth road surface in conjunction with the operation of the internal combustion engine at known speed and load conditions. The sound energy of interest is preferably at a low frequency, e.g., between 50 Hz and 250 Hz.

The second speed/load region 320 may be subdivided into multiple subregions, including e.g., subregions 322, 324, and 326. The first subregion 322 includes that portion of the second region 320 at which the load is negative, i.e., wherein the vehicle is coasting or braking. The internal combustion engine is in the ON state, preferably in a fuel cutoff state, and spinning at a predetermined speed, e.g., at 1200 RPM. The second subregion 324 includes that portion of the second region 320 at which the load is low, and most or all of the propulsion torque is generated by the electric machine(s). The internal combustion engine is in the ON state and operating at low speed and low torque. The third subregion 326 includes that portion of the second region 320 at which the load is moderate, and the electric machine(s) are operating at or near their maximum torque output, with additional propulsion torque being generated by the internal combustion engine.

The third region 330 includes the speed/load operating points at which engine operation may be perceptible in the passenger compartment and to the vehicle operator. Such operation includes operating the electric machine(s) at or near their maximum torque output, with additional propulsion torque being generated by the internal combustion engine.

Referring again to FIG. 4, a plurality of speed/load operating regions associated with the second control strategy 400 are graphically shown, and are associated with the normal mode for powertrain operation with charge-sustaining mode of the energy storage device. The numerical values are non-limiting and provided for purposes of illustration. Speed 402 is shown on the horizontal axis in the form of vehicle speed (mph) and load 404 is shown on the vertical axis in the form of transmission output power (kW). The magnitudes for the speed 402 and load 404 are merely illustrative of one non-limiting embodiment. Line 403 indicates a maximum charging power that is associated with a maximum negative value for the load 404. Line 405 illustrates a speed/load boundary indicating a transition between engine ON and OFF states. Line 425 illustrates a second speed/load boundary line.

Figure 4:
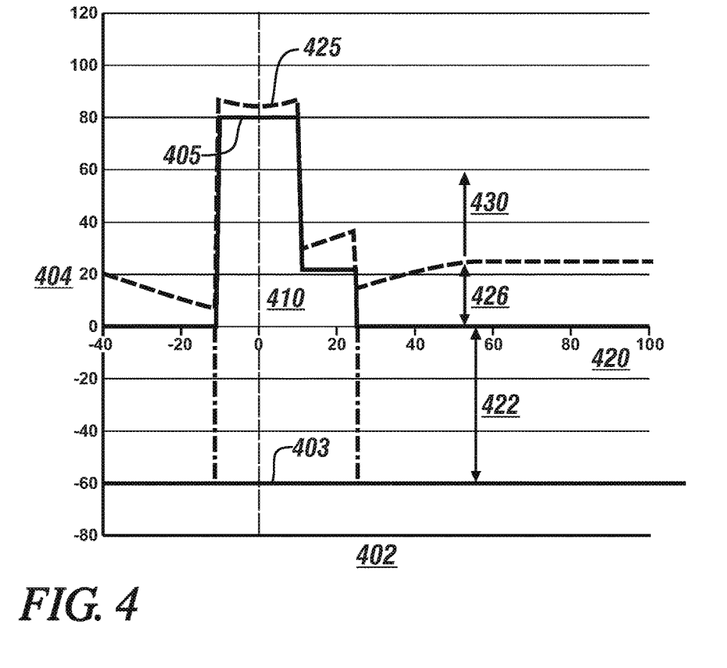
FIG. 4 graphically illustrates a plurality of operating regions defined by vehicle speed and transmission output power that are associated with the second control strategy including operation of the powertrain system in the normal mode charge-sustaining of the energy storage device, in accordance with the disclosure.

A first speed/load region 410 is circumscribed by lines 403 and 405, and indicates speed/load operating points at which the internal combustion engine is in an OFF state, and all propulsion torque is supplied by the electric machine(s).

A second speed/load region 420 is circumscribed by lines 405 and 425, and indicates speed/load operating points at which the internal combustion engine is in the ON state with its operation constrained in a manner that renders its operation imperceptible in the passenger compartment and to the vehicle operator. The limits associated with the second speed/load region 420 may be empirically determined for a vehicle and powertrain system configuration, as described herein. The second speed/load region 420 may be subdivided into multiple subregions, including, e.g., subregions 422 and 426. The first subregion 422 includes that portion of the second region 420 at which the load is negative, i.e., wherein the vehicle is coasting or braking. The internal combustion engine is in the ON state, preferably in a fuel cutoff state, and spinning at a predetermined speed, e.g., at 1200 RPM. The second subregion 426 includes that portion of the second region 420 at which the load is low or moderate, and most or all of the propulsion torque is generated by the electric machine(s). The internal combustion engine is in the ON state and operating at low speed and low torque, and the electric machine(s) are operating at or near their maximum torque output, with additional propulsion torque being generated by the internal combustion engine.

The third region 430 includes the speed/load operating points at which engine operation may be perceptible in the passenger compartment and to the vehicle operator. Such operation includes operating the electric machine(s) at or near their maximum torque output, with additional propulsion torque being generated by the internal combustion engine.

Referring again to FIG. 5, a plurality of speed/load operating regions associated with the third control strategy 500 are graphically shown, and are associated with the sport mode for powertrain operation with charge-depletion of the energy storage device. The numerical values are non-limiting and provided for purposes of illustration. Speed 502 is shown on the horizontal axis in the form of vehicle speed (mph) and load 504 is shown on the vertical axis in the form of transmission output power (kW). The magnitudes for the speed 502 and load 504 are merely illustrative of one non-limiting embodiment. Line 503 indicates a maximum charging power that is associated with a maximum negative value for the load 504. Line 505 illustrates a speed/load boundary indicating a transition between engine ON and OFF states. Line 525 illustrates a second speed/load boundary line.

Figure 5:
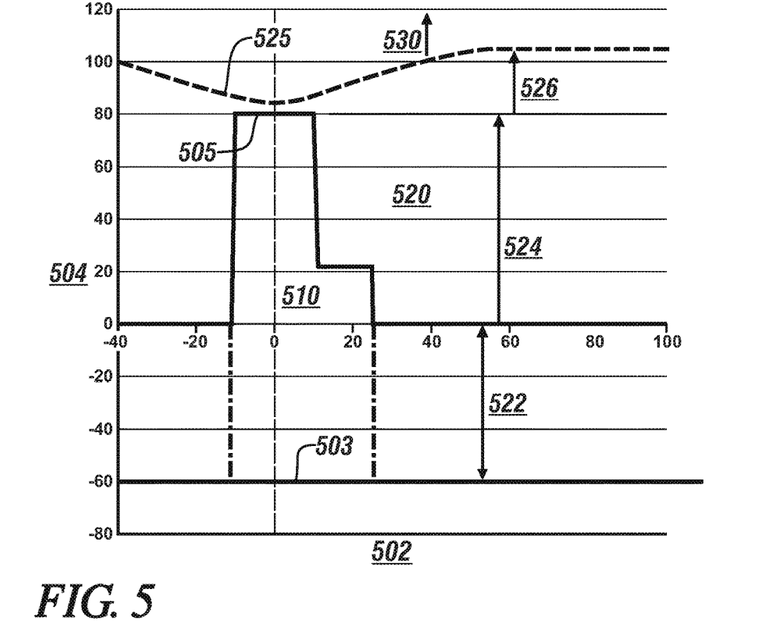
FIG. 5 graphically illustrates a plurality of operating regions defined by vehicle speed and transmission output power that are associated with the third control strategy including operation of the powertrain system in the sport mode with charge-depletion of the energy storage device, in accordance with the disclosure.

A first speed/load region 510 is circumscribed by lines 503 and 505, and indicates speed/load operating points at which the internal combustion engine is in an OFF state, and all propulsion torque is supplied by the electric machine(s).

A second speed/load region 520 is circumscribed by lines 505 and 525, and indicates speed/load operating points at which the internal combustion engine is in the ON state with its operation constrained in a manner that renders its operation imperceptible in the passenger compartment and to the vehicle operator. The limits associated with the second speed/load region 520 may be empirically determined for a vehicle and powertrain system configuration, as described herein. This may include capturing acoustic measurements at one or more locations within a vehicle interior under smooth road conditions and at various road load conditions. The second speed/load region 520 may be subdivided into multiple subregions, including, e.g., subregions 522, 524, and 526. The first subregion 522 includes that portion of the second region 520 at which the load is negative, i.e., wherein the vehicle is coasting or braking. The internal combustion engine is in the ON state, preferably in a fuel cutoff state, and spinning at a predetermined speed, e.g., at 1200 RPM. The second subregion 524 includes that portion of the second region 520 at which the load is low, and most or all of the propulsion torque is generated by the electric machine(s). The internal combustion engine is in the ON state and operating at low speed and low torque. The third subregion 526 includes that portion of the second region 520 at which the load is moderate, and the electric machine(s) are operating at or near their maximum torque output, with additional propulsion torque being generated by the internal combustion engine.

The third region 530 includes the speed/load operating points at which engine operation may be perceptible in the passenger compartment and to the vehicle operator. Such operation includes operating the electric machine(s) at or near their maximum torque output, with additional propulsion torque being generated by the internal combustion engine.

Referring again to FIG. 6, a plurality of speed/load operating regions associated with the fourth control strategy 600 are graphically shown, and are associated with the sport mode for powertrain operation with charge-sustaining mode of the energy storage device. The numerical values are non-limiting and provided for purposes of illustration. Speed 602 is shown on the horizontal axis in the form of vehicle speed (mph) and load 604 is shown on the vertical axis in the form of transmission output power (kW). The magnitudes for the speed 602 and load 604 are merely illustrative of one non-limiting embodiment. Line 603 indicates a maximum charging power that is associated with a maximum negative value for the load 604. Line 605 illustrates a speed/load boundary indicating a transition between engine ON and OFF states. Line 625 illustrates a second speed/load boundary line.

Figure 6:
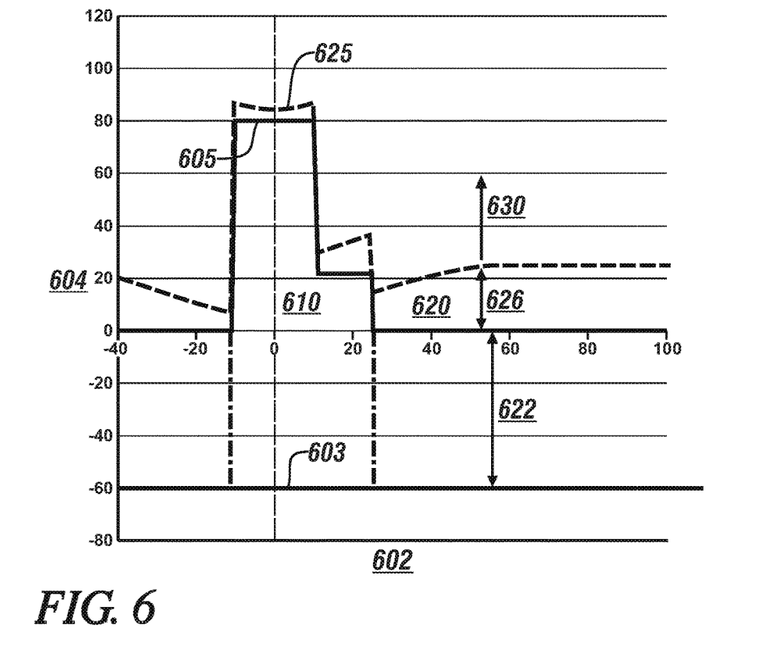
FIG. 6 graphically illustrates a plurality of operating regions defined by vehicle speed and transmission output power that are associated with the fourth control strategy including operation of the powertrain system the sport mode with charge-sustaining of the energy storage device, in accordance with the disclosure.

A first speed/load region 610 is circumscribed by lines 603 and 605, and indicates speed/load operating points at which the internal combustion engine is in an OFF state, and all propulsion torque is supplied by the electric machine(s).

A second speed/load region 620 is circumscribed by lines 605 and 625, and indicates speed/load operating points at which the internal combustion engine is in the ON state with its operation constrained in a manner that renders its operation imperceptible in the passenger compartment and to the vehicle operator. The limits associated with the second speed/load region 620 may be empirically determined for a vehicle and powertrain system configuration, as described herein. This may include capturing acoustic measurements at one or more locations within a vehicle interior under smooth road conditions and at various road load conditions. The second speed/load region 620 may be subdivided into multiple subregions, including, e.g., subregions 622 and 626. The first subregion 622 includes that portion of the second region 620 at which the load is negative, i.e., wherein the vehicle is coasting or braking. The internal combustion engine is in the ON state, preferably in a fuel cutoff state, and spinning at a predetermined speed, e.g., at 1200 RPM. The second subregion 626 includes that portion of the second region 620 at which the load is low or moderate, and most or all of the propulsion torque is generated by the electric machine(s). The internal combustion engine is in the ON state and operating at low speed and low torque, and the electric machine(s) are operating at or near their maximum torque output, with additional propulsion torque being generated by the internal combustion engine.

The third region 630 includes the speed/load operating points at which engine operation may be perceptible in the passenger compartment and to the vehicle operator. Such operation includes operating the electric machine(s) at or near their maximum torque output, with additional propulsion torque being generated by the internal combustion engine.

Referring again to FIG. 2, a selected one of the first, second, third and fourth preferred engine speeds 301, 401, 501 and 601 is selected (220) and employed to determine a final transmission state 222 and a final selected engine speed 224, which are employed to control operation of the powertrain system in response to the operator commands. As such, the powertrain control routine 200 controls the electric machine(s) to generate output torque in response to the output torque request when the output torque request and the vehicle speed are within the first respective operating region 310, 410, 510, 610.

Furthermore, the powertrain control routine controls the electric machine(s) to generate output torque and controls operation of the internal combustion engine at the final selected engine speed 224 within the operating region that is imperceptible in the passenger compartment or to the vehicle operator when the output torque request and the vehicle speed are within the second respective operating region 320, 420, 520, 620.

Furthermore, the powertrain control routine controls the electric machine(s) and the internal combustion engine to cooperate to generate the output torque at the final selected engine speed 224 in response to the output torque request when the output torque request is greater than the maximum state for the output torque that is associated with the vehicle speed of the second respective operating region 320, 420, 520, 620.

As such, engine speed and engine torque may be manipulated at different vehicle speeds and axle torque commands based on different operator-selectable modes such that the operator is unlikely to perceive operation of the internal combustion engine, thus providing an all-electric feel to vehicle operation. The engine acts differently based on charge state, operator-selectable mode, vehicle speed and axle torque commands.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for controlling a hybrid powertrain system for a vehicle that includes an internal combustion engine and an electric machine mechanically coupled via a geartrain to generate mechanical power that is transferable to a driveline and generate electric power, wherein the electric power may be storable on an energy storage device, the method comprising:
   determining an operator-selected mode and a charging mode for the energy storage device;
   for the operator-selected mode and the charging mode for the energy storage device:
      determining a first speed/load region at which the internal combustion engine is in an OFF state, wherein the first speed/load region is defined by output torque and vehicle speed,
      determining a second speed/load region that includes a preferred speed that is selected for operating the internal combustion engine, wherein the second speed/load region is defined by output torque and vehicle speed and wherein the preferred engine speed is substantially imperceptible in a passenger compartment of the vehicle;
   determining an output torque request and a present vehicle speed; and
   operating the internal combustion engine at the preferred engine speed that is imperceptible in the passenger compartment when the output torque request and the present vehicle speed are within the second operating region.

2. The method of claim 1, further comprising controlling the electric machine to generate output torque responsive to the output torque request while operating the internal combustion engine at the preferred engine speed that is imperceptible in the passenger compartment when the output torque request and the vehicle speed are within the second operating region.

3. The method of claim 1, further comprising controlling the electric machine and the internal combustion engine to cooperate to generate the output torque in response to the output torque request when the output torque request is greater than the maximum state for the output torque that is associated with the vehicle speed of the second operating region.

4. The method of claim 1, further comprising controlling the electric machine to generate output torque in response to the output torque request when the output torque request and the vehicle speed are within the first operating region.

5. The method of claim 1, wherein the charging mode comprises a charge sustaining mode.

6. The method of claim 1, wherein the charging mode comprises a charge depletion mode.

7. The method of claim 1, wherein the operator-selected mode comprises a normal mode related to a transmission shift schedule.

8. The method of claim 1, wherein the operator-selected mode comprises a sport mode related to a transmission shift schedule.

9. The method of claim 1, wherein the preferred engine speed that is substantially imperceptible in a passenger compartment of the vehicle comprises an engine speed wherein a sound energy that is generated by operation of the internal combustion engine is less than a sound energy that is generated by operation of the vehicle on a smooth road surface in conjunction with the operation of the internal combustion engine.

10. The method of claim 1, wherein the first speed/load region is defined by output torque and vehicle speed at which the internal combustion engine is in an OFF state.

11. The method of claim 1, wherein the second operating region includes a maximum state for the output torque associated with the vehicle speed.

12. A hybrid powertrain system for a vehicle, comprising:
an internal combustion engine and an electric machine mechanically coupled via a geartrain to generate mechanical power that is transferable to a driveline and generate electric power, wherein the electric power may be storable on an energy storage device; and
a controller including an instruction set, the instruction set executable to:
determine an operator-selected mode and a charging mode for the energy storage device;
for the operator-selected mode and the charging mode for the energy storage device:
determine a first speed/load region at which the internal combustion engine is in an OFF state, wherein the first speed/load region is defined by output torque and vehicle speed, and
determine a second speed/load region that includes a preferred speed that is selected for operating the internal combustion engine, wherein the first speed/load region is defined by output torque and vehicle speed and wherein the preferred engine speed is substantially imperceptible in a passenger compartment of the vehicle;
determine an output torque request and a present vehicle speed; and
operate the internal combustion engine at the preferred engine speed that is imperceptible in the passenger compartment when the output torque request and the present vehicle speed are within the second operating region.

13. The hybrid powertrain of claim 12, further comprising the instruction set executable to control the electric machine to generate output torque responsive to the output torque request while operating the internal combustion engine at the preferred engine speed that is imperceptible in the passenger compartment when the output torque request and the vehicle speed are within the second operating region.

14. The hybrid powertrain of claim 12, further comprising the instruction set executable to control the electric machine and the internal combustion engine to cooperate to generate the output torque in response to the output torque request when the output torque request is greater than the maximum state for the output torque that is associated with the vehicle speed of the second operating region.

15. The hybrid powertrain of claim 12, further comprising the instruction set executable to control the electric machine to generate output torque in response to the output torque request when the output torque request and the vehicle speed are within the first operating region.

16. The hybrid powertrain of claim 12, wherein the charging mode comprises a charge sustaining mode.

17. The hybrid powertrain of claim 12, wherein the charging mode comprises a charge depletion mode.

18. The hybrid powertrain of claim 12, wherein the preferred engine speed that is substantially imperceptible in a passenger compartment of the vehicle comprises an engine speed wherein a sound energy that is generated by operation of the internal combustion engine is less than a sound energy that is generated by operation of the vehicle on a smooth road surface in conjunction with the operation of the internal combustion engine.

* * * * *